United States Patent [19]
Friedland

[11] 3,875,964
[45] Apr. 8, 1975

[54] MULTIPLE ELEMENT CONTROL VALVE

[75] Inventor: Harry Friedland, Salt Lake City, Utah

[73] Assignee: Process Systems, Inc., Salt Lake City, Utah

[22] Filed: May 21, 1973

[21] Appl. No.: 362,214

[52] U.S. Cl. ............................................. 137/599
[51] Int. Cl. ........................................... F16k 11/24
[58] Field of Search ........................... 137/356, 599

[56] References Cited
UNITED STATES PATENTS

| | | | |
|---|---|---|---|
| 1,757,059 | 5/1930 | Rickenberg | 137/599 X |
| 2,589,373 | 3/1952 | Hammock | 137/599 |
| 2,627,280 | 2/1953 | Adelson | 137/599 X |

Primary Examiner—Robert G. Nilson
Attorney, Agent, or Firm—Christie, Parker & Hale

[57] ABSTRACT

A huge control valve has a valve body comprising a block of castable material, such as concrete, and a plurality of pipes imbedded in the block. The pipes extend through the block from end to end. At one end of the block, the pipes are open. At the other end of the block, the pipes are connected to individually actuatable, preferably bistable, valve elements located external to the block. A diverging adapter conduit connects an upstream line conduit to the end of the block where the valve elements are located, and a diverging adapter conduit connects a downstream line conduit to the other end of the block. Preferably, the valve elements are spaced different distances from the block and are controlled by actuators external to the adapter conduits, which are each attached to a mounting frame anchored to the block. The valve body is constructed by fabricating a form, placing the pipes in the form in the desired arrangement, pouring the castable material into the form to produce a casting, and removing the form after the casting has hardened. In a specific application, the control valve is connected in a closed loop with a wind tunnel and a blower to produce shock waves in the wind tunnel.

26 Claims, 5 Drawing Figures 3,875,964

MULTIPLE ELEMENT CONTROL VALVE

BACKGROUND OF THE INVENTION

This invention relates to the control of fluid at high mass flow rates and, more particularly, to a huge, fast acting control valve that is simple of design, cheap to construct, and easy to maintain.

When a fast acting control valve is placed in a fluid line handling fluid flowing at a high mass flow rate, its operation produces transient forces that may damage the portions of the system downstream of the valve. Particularly vulnerable are the thin walled pipes and conduits, which have been known to become mangled on occasion under the surges resulting from fast opening and closing of the valve. In order to prevent mutilation of pipes and conduits due to transient forces, it is normal practice to imbed them in concrete blocks that serve an anchoring function.

There are a number of applications for a huge control valve, such as controlling the flow rate through a wind tunnel or shutting off the flow from a nuclear steam generating silo upon detection of a radiation leak. Typically, such a control vlave might be called into service for line conduits with a diameter ranging from 2 to 45 ft., or more. The large size of such a control valve greatly magnifies the problems associated with its construction. A very large actuator is required to operate the control valve with reasonably fast response. Tremendous power demands are made by the actuator in the course of operation. Sudden changes in the flow rate give rise to enormous transient forces in the control valve and the downstream pipes. The problem of sealing the control valve when shut off is more complicated. The cost of fabricating moving parts of such proportions becomes prohibitive and maintenance is made more difficult.

SUMMARY OF THE INVENTION

According to the invention, a huge control valve is constructed of a plurality of individually actuatable, relatively small individually actuatable valve elements, interconnected between huge upstream and downstream line conduits. The control valve body comprises a block of a first material having first and second external faces and a plurality of pipes imbedded in and extending through the block. The pipes are made of a second material different from the first material. Each pipe has a first open end exposed at the first face and a second open end exposed at the second face. The upstream line conduit is coupled to the first end of the pipes, and the downstream line conduit is coupled to the second end of the pipes. The valve elements are located external to the block adjacent to one of the faces, and are coupled to the respective pipes at one end to control the flow of fluid therethrough between the upstream and downstream line conduits.

To increase the flow capacity of the control valve, more valve elements can be added, rather than increasing the size of the valve elements. Consequently, the problems inherent in a size increase are avoided. The block can be made as large as necessary for the specified maximum mass flow rate. A fast response can be achieved without the expenditure of large quantities of power, because the individual valve elements can be operated in parallel by actuators of reasonable size; the actuation time of the control valve is determined by the actuation time of the largest valve element. Easy access is available to the valve elements for maintenance purposes because they are located external to the block and are easily removable from the respective pipes.

In the preferred embodiment, the block is made of concrete, the pipes are made of metal, and the valve elements are secured to mounting flanges at the ends of the respective pipes adjacent to the upstream face of the block. The flanges are spaced different distances from the face of the block so the valve elements are staggered and, thus, more isolated from one another. The faces of the block have a substantially larger cross section than the upstream and downstream line conduits. Diverging adapter conduits connect the upstream and downstream line conduits to the respective faces of the block. The valve elements are bistable and are located inside one of the adapter conduits. Their actuators are located outside the adapter conduits.

Reliability of the control valve when used as a shut-off valve can be increased by placing a pair of individually actuatable valve elements at opposite ends of each pipe and actuating the valve elements of each pair together in redundant fashion.

The valve body is constructed by fabricating a form suitable for casting the block. The pipes are placed in the form to extend from one end of the form to the other. Preferably, mounting plates to secure the adapter conduits are placed at the ends of the form. If desired, these plates can be used as two sides of the form and can hold the pipes in position prior to casting. Concrete or other suitable material is poured into the form to produce a casting. After the material has hardened, the form is removed, leaving the casting with the pipes imbedded therein and the mounting plates anchored at its ends. Finally, the valve elements and adapter conduits are connected to the valve body.

The use of concrete is of particular advantage because of its low cost, common availability for large scale building projects, and its suitability to support the pipes during downstream transient surges. Not only does the concrete insure the structural integrity of the pipes, but the pipes serve as reinforcing members to strengthen the concrete block.

A very important application of the invention is a wind tunnel system. Due to the fast response of the control valve and the capability of controlling the change in flow rate in any desired manner by proper sequencing of the operation of the individual valve elements, shock waves having widely different characteristics can be generated without large pressure drops. Specifically, a blower generating as little pressure as 60 psig in a closed loop fluid system with the control valve and a wind tunnel produces in the wind tunnel large shocks having controllable characteristics.

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENTS

Figure 1:
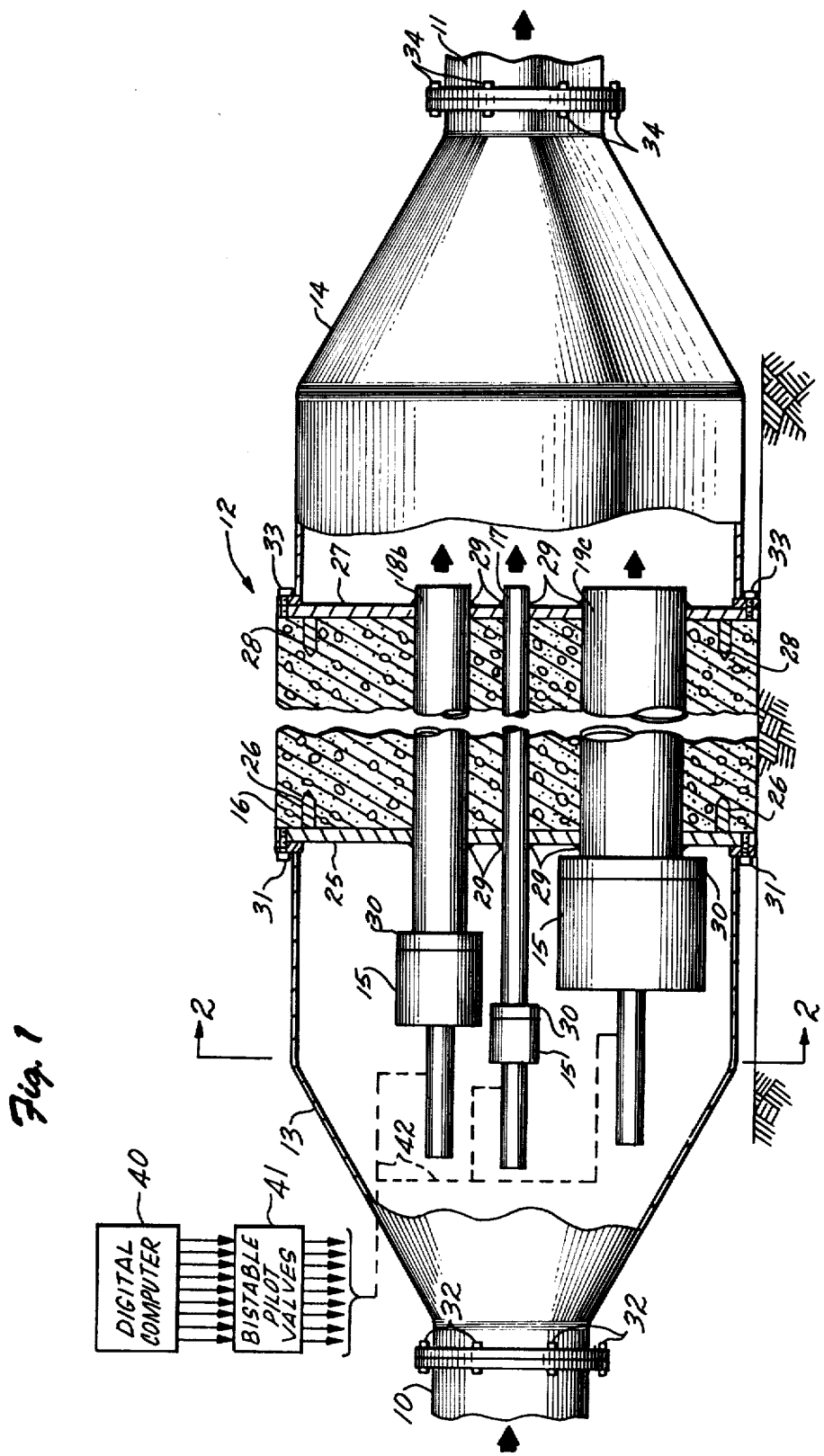
FIG. 1 is a side, partially sectional view of one embodiment of a control valve embodying the principles of the invention.
Figure 2:
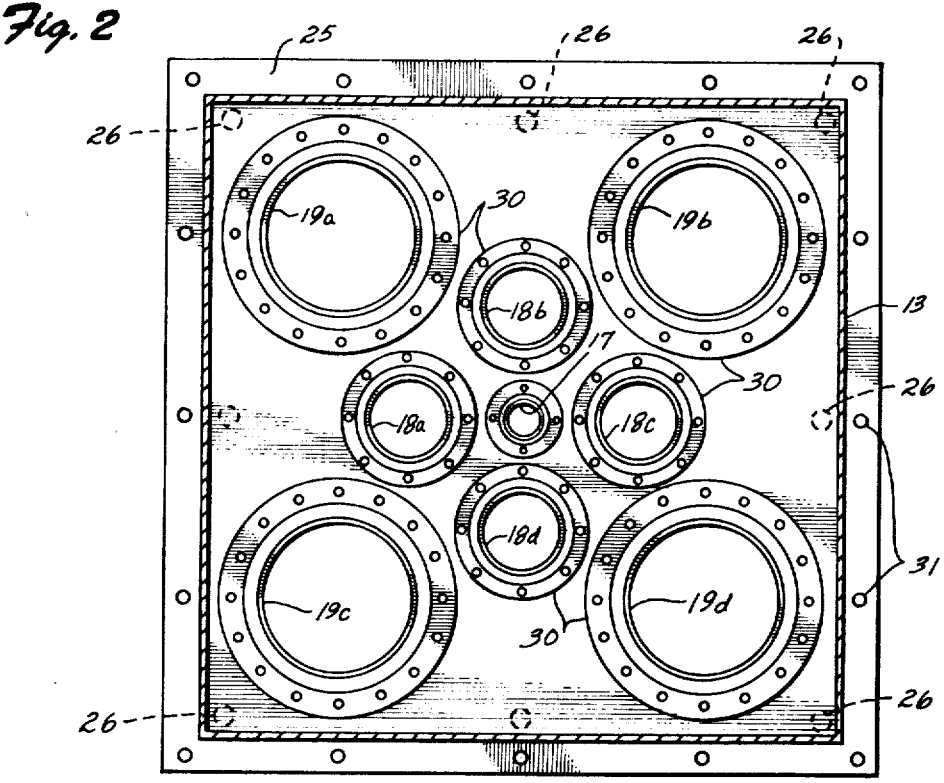
FIG. 2 is a front view of the valve body of FIG. 1 without the individual valve elements.

In FIGS. 1 and 2, a control valve interconnects an upstream line conduit 10 and a downstream line conduit 11. Solid arrows indicate the direction of fluid flow. By way of example, line conduits 10 and 11 could have a diameter in the range of 2 to 45 ft., or larger. Consequently, the control valve assumes huge proportions. The control valve comprises a valve body 12, a diverging upstream adapter conduit 13, a downstream diverging adapter conduit 14, and a plurality of individually actuatable, bistable valve elements 15. The term "bistable valve element" refers to a valve element having a plug that is controlled to assume one of only two positions. In one position, the plug seals an orifice and the valve element is in its closed state. In the other position, the plug clears the orifice and the valve element is in its open state. Valve body 12 comprises a solid hexahedral block 16 of concrete in which are imbedded a plurality of long, straight, parallel metal pipes equal in number to valve elements 15. The pipes and conduits are made of a metal that is chemically resistant to, and non-reactive with, the fluid handled by the control valve. As depicted in FIG. 2, which is a view of the upstream end of valve body 12 looking downstream from the plane indicated by the section line in FIG. 1 in the absence of valve elements 15, a pipe 17 has a small diameter, pipes 18a, 18b, 18c, and 18d have an intermediate diameter, and pipes 19a, 19b, 19c, and 19d have a large diameter. Pipe 17 is at the center of block 16, pipes 18a, 18b, 18c, and 18d surround pipe 17 along the sides of block 16, and pipes 19a, 19b, 19c, and 19d lie at the corners of block 16 to provide a space conserving pipe arrangement. FIG. 1, which only depicts pipes 17, 18b, and 19c, is not a section through a single plane in FIG. 2, but rather is a section designed to depict one of each of the different size pipes and their corresponding valve elements 15.

A metal mounting plate 25 is secured to one end of block 16 by elongated anchors 26 imbedded in the concrete. Similarly, a metal mounting plate 27 is secured to the opposite end of block 16 by elongated anchors 28 imbedded in the concrete. Pipes 17, 18a, 18b, 18c, and 18d, 19a, 19b, 19c, and 19d extend through block 16 from end to end, pass through holes in plates 25 and 27 where they are secured by weld joints 29, and terminate external to valve body 12. The upstream end of pipe 17 is spaced the furthest from valve body 12, the upstream ends of pipes 19a, 19b, 19c, and 19d are spaced closest to valve body 12, and the upstream ends of pipes 18a, 18b, 18c, and 18d are spaced an intermediate distance from valve body 12. Mounting flanges 30 are welded to the upstream ends of the respective pipes. Control elements 15 are secured to mounting flanges 30 of the respective pipes in the manner described below in connection with FIG. 3. Adapter conduit 13 is secured to mounting plate 25 by fasteners 31 and to line conduit 10 by fasteners 32. Similarly, adapter conduit 14 is secured to mounting plate 27 by fasteners 33 and to line conduit 11 by fasteners 34. Plates 25 and 27 and the ends of block 16 are substantially larger in cross-sectional area than line conduits 10 and 11 to provide sufficient space for the valve elements and pipes to occupy without unduly restricting the flow through the control valve.

A source of binary signals shown as a digital computer 40 is coupled to bistable pilot valves 41. The output signals from computer 40 are weighted according to a binary code in which their sum represents the desired flow rate through the control valve. Pilot valves 41 are equal in number to valve elements 15. For the purpose of discussion, it is assumed that pilot valves 41 are identical to the pilot valves disclosed in my copending application Ser. No. 111,945, filed Feb. 2, 1971, now U.S. Pat. No. 3,746,041 the disclosure of which is incorporated herein by reference, and that valve elements 15 are operated responsive to air pressure. Briefly, each of these pilot valves is a three-way valve having two states. In one state, each pilot valve connects a common manifold supplied by air under pressure to the corresponding valve element 15 to place it in one state, e.g., open. In the other state, each pilot valve connects the corresponding valve element 15 to a common exhaust manifold leading to the atmosphere to place the valve element 15 in the other state, e.g., closed. Pilot valves 41 are coupled to the corresponding valve elements 15 by air hoses or conduits represented by dashed lines 42. These conduits are introduced into the interior of the control valve through a conventional fitting (not shown) in adapter conduit 13. Each pilot valve 41 is controlled by a different binary signal from computer 40. Pilot valves 41 are placed in one state or the other, depending upon the binary values, i.e., "0" or "1", of the corresponding binary signals from computer 40. In summary, valve elements 15 are placed in one of two states, i.e., open or closed, depending upon the value of the corresponding binary output signals from computer 40.

In operation, computer 40 issues a set of binary output signals representing the desired flow rate through the control valve, pilot valves 41 operate valve elements 15 responsive to such binary output signals, and fluid from line conduit 10 passes through those valve elements 15 in the open state and their corresponding pipes to line conduit 11. The sum of the effective orifice areas of those valve elements 15 in the open state determines the flow rate through the control valve. In a typical embodiment, the binary signals from computer 40 and the effective orifice areas of the valve elements 15 are weighted 1, 2, 4, 8, 16, 32, 64, 64, 64, corresponding to pipes 17, 18a, 18b, 18c, 18d, 19a, 19b, 19c, and 19d, respectively.

The concrete of block 16 serves as an inexpensive valve body and as a support to anchor the pipes running through it; the pipes running through the concrete also serve to reinforce and strengthen it. The length of block 12 and the pipes imbedded therein is determined by two factors, namely, the quantity of concrete required to support and anchor the control valve, and the length of the imbedded pipe that will achieve maximum damping by tuning the pipes. In other words, the pipe length is selected so valve body 12 functions as an acoustical baffle to minimize pressure waves and fluid surges. The operation of valve elements 15 in parallel permits the control valve to respond very quickly; the limiting factor is the response time of the largest valve element. In a typical implementation, a control valve can be fully opened from a closed position, or vice versa, in 150 milliseconds or less, even with line conduits having a diameter of 45 ft. or more.

The difference in spacing of valve elements 15 from valve body 12 serves to isolate valve elements 15 from each other during operation, thereby preventing possible interaction, and facilitates disassembly of valve elements 15 for replacement. Since valve elements 15 are relatively small in size and located external of valve body 12 in adapter conduit 13, maintenance can be easily accomplished. A hatch in adapter conduit 13 (not shown) would be provided to permit maintenance personnel to gain access to valve elements 15.

To construct the control valve disclosed in FIG. 1, a form corresponding in size and shape to block 16 is first fabricated. The form could be a hexahedral box made of four wooden sides and a wooden bottom, and open at its top for pouring concrete. Alternatively, plates 25 and 27 could be employed as two sides of the form, the remainder of the form being made of wood. After the form is constructed, pipes 17, 18a, 18b, 18c, 18d, 19a, 19b, 19c, and 19d are placed in the form to extend through holes in plates 25 and 27 to points external of the form, the pipes are welded to plates 25 and 27, respectively. Next, the concrete is poured into the form and permitted to set up. After the concrete has hardened sufficiently, the wooden portions of the form are removed leaving valve body 12, as disclosed in FIG. 1. Finally, mounting flanges 30 are welded to the upstream ends of the pipes, valve elements 15 are secured to mounting flanges 30, and adapter conduits 13 and 14 are secured to mounting plates 25 and 27, respectively, to complete assembly of the control valve.

Figure 3:
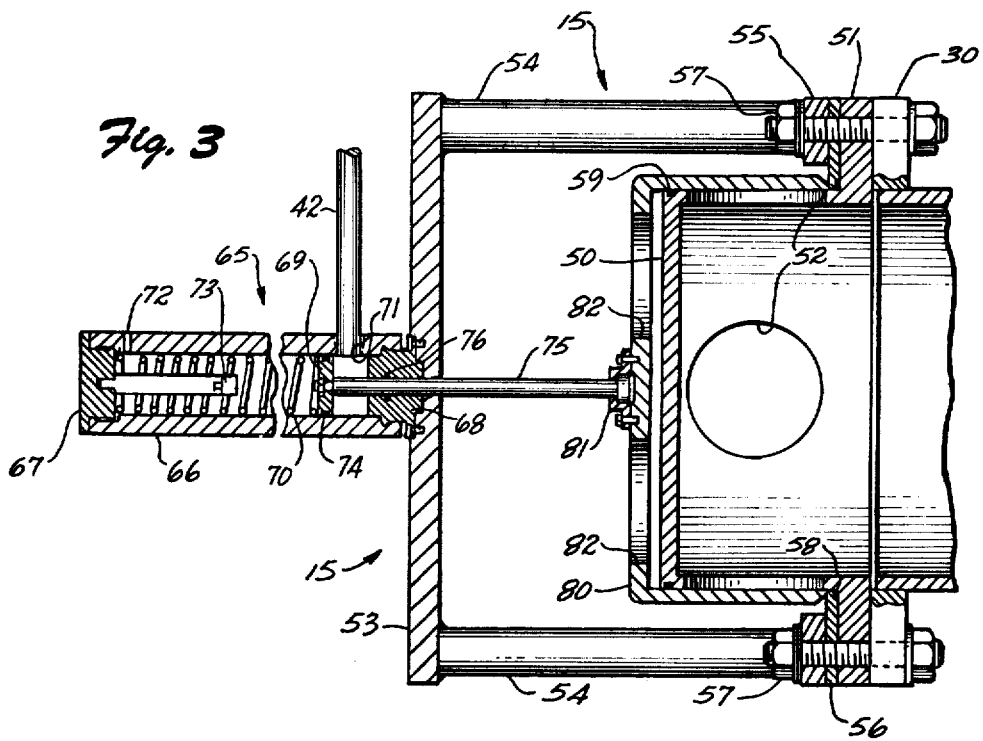
FIG. 3 is a side sectional view of one of the individual valve elements of FIG. 1 showing its construction in detail.

Reference is made to FIG. 3 for a detailed description of one of valve elements 15. A stationary cylindrical cage 50 has an open end surrounded by a mounting flange 51. Perforations 52 are formed in the walls of cage 50. The sum of the cross-sectional areas of perforations 52 determine the flow rate through the valve element and, thus, its weighting relative to the remaining valve elements. Flange 51 abuts flange 30 of the corresponding pipe, and the open end of cage 50 faces toward the open end of the corresponding pipe. A support platform 53 is connected by spacers 54 to an annular base 55. Spacers 54 are sufficiently thin and spaced apart to prevent choking of the fluid flow through the valve element. Platform 53, spacers 54, and base 55 could be integrally formed or assembled from separate parts. A seal retaining ring 56 is sandwiched between base 55 and mounting flange 51. Fasteners 57 secure mounting flange 51, retaining ring 56, and base 55 to mounting flange 30 of the corresponding pipe. An O-ring seal 58 is held between retaining ring 56 and the adjacent surface of cage 50. An O-ring seal 59 resides in a retaining groove formed in the surface of cage 50 on the opposite side of perforations 52 from seal 58.

An actuator 65 is mounted on platform 53. Actuator 65 comprises a cylinder 66 having end caps 67 and 68. End cap 68 is secured to platform 53. A piston 69 rides in cylinder 66. A compression spring 70 lies on one side of piston 69, and an air supply port 71 is formed in cylinder 66, on the other side of piston 69. Port 71 is connected by hose 42 to the corresponding pilot valve (see FIG. 1). An exhaust port 72, which communicates with the interior of adapter conduit 13, is formed in cylinder 66 near end cap 67. A piston stop 73 is secured to end cap 67 and extends along the axis of cylinder 66. A seal 74 surrounds piston 69. A piston rod 75 connects piston 69 to a cylindrical plug 80, which is adapted to fit over cage 50, as illustrated in FIG. 3. A seal 76 surrounds rod 75 where it passes through end cap 68. Rod 75 is attached to plug 80 by a swivel joint 81. Pressure balancing openings 82 are formed at the end of plug 80.

In operation, when the pilot valve for the valve element assumes one state, air under pressure entering cylinder 66 through port 71 overcomes the force of spring 70 and the fluid pressure in adapter conduit 13 to drive piston 69 to the left, as viewed in FIG. 3, against stop 73. As a result, plug 80 clears perforations 52 to permit fluid flow from adapter conduit 13 through perforations 52 to the pipe. This is the open state of the valve element. Piston stop 73 controls the length of the stroke of plug 80, so plug 80 is completely out of the fluid stream passing through perforations 52 when the valve element is in its open state. In other words, the open end of plug 80 lies between the edge of perforations 52 and seal 59. This prevents small changes in the position of plug 80 from modulating the flow of the valve element in the open state. When the pilot valve for the valve element assumes the other state, air is vented from cylinder 66 through port 71 to the atmosphere, and piston 69 is driven to the right, as viewed in FIG. 3, by the force of spring 70 and the fluid pressure in adapter conduit 13. As a result, plug 80 is urged against seal 58. Seals 58 and 59 prevent passage of fluid from adapter conduit 13 through perforations 52 to the corresponding pipe. This is the closed state of the valve element.

Figure 4:
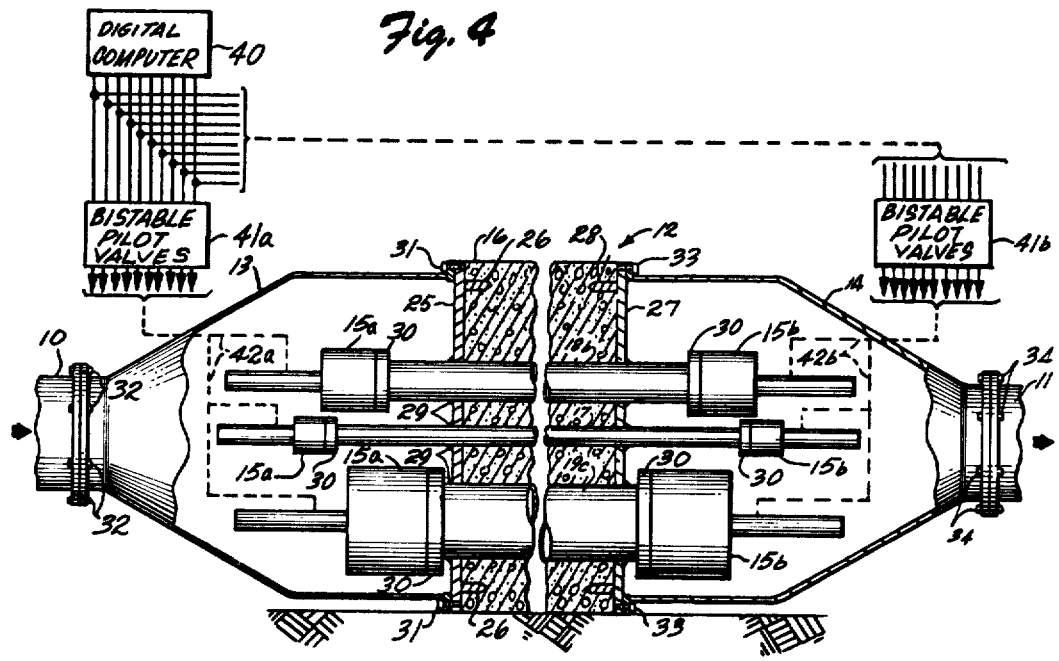
FIG. 4 is a side, partially sectional view of an alternative embodiment of a control valve embodying the principles of the invention.

Reference is made to FIG. 4 for an alternative embodiment of the invention for use as a highly reliable shut-off valve. This embodiment is identical to the embodiment of FIG. 1, except that individually actuatable, bistable valve elements are also connected to the downstream ends of the pipes extending through valve body 12. As illustrated, a pair of individually actuatable, bistable valve elements 15a and 15b are mounted at opposite ends of each pipe extending through valve body 12. Each pair of valve elements 15a and 15b is actuated together in redundant fashion. Bistable pilot valves 41a operate valve elements 15a via hoses 42a and bistable pilot valves 41b operate valve elements 15b via hoses 42b responsive to the binary output signals from computer 40. The reliability of the shut-off valve is improved because the desired flow rate is terminated even if one valve element of any particular pair fails.

Figure 5:
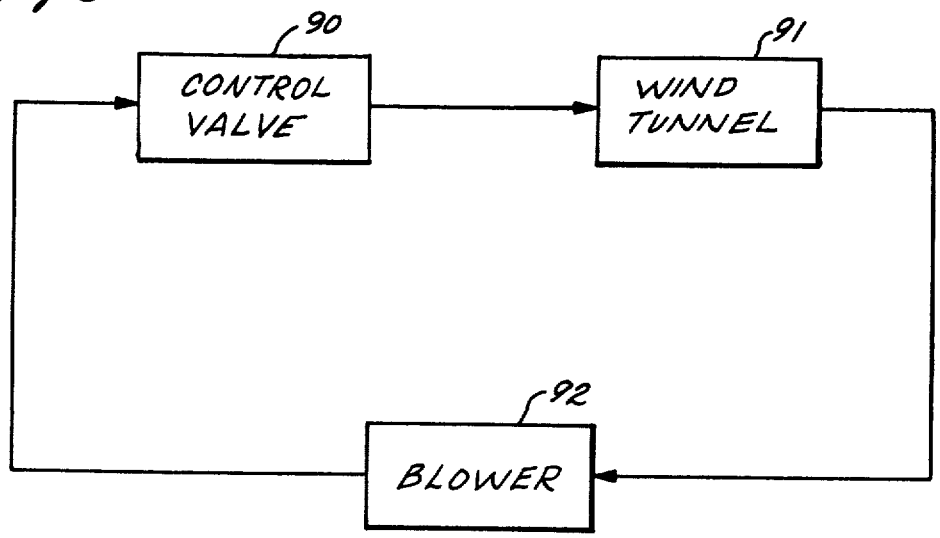
FIG. 5 is a schematic block diagram of the control valve of FIG. 1 in a wind tunnel system.

In FIG. 5, a specific control valve application is depicted. Control valve 90, which is preferably identical to the control valve illustrated in FIG. 1, a wind tunnel 91, and a blower 92 are connected in a closed loop. Air or other fluid is coupled from the outlet (high pressure side) of blower 92 through control valve 90 to wind tunnel 91, and from wind tunnel 91 to the inlet (low pressure side) of blower 92. Initially, all the valve elements of control valve 90 are open, and blower 92 establishes a static pressure in the range of 60 psig in wind tunnel 91. A shock wave is generated in wind tunnel 91 by quickly closing all the valve elements of control valve 90, thereby suddenly reducing pressure downstream of control valve 90. The characteristics of the shock wave can be precisely controlled by the sequence in which the valve elements are closed. Thus, the use of control valve 90 permits transient disturbances having characteristics that are controlled by a digital computer or programmer to be set up in wind tunnels having huge diameters, e.g., 40 ft. or more, without the expenditure of substantial sums of money for controlling the fluid flow or generating extremely high pressures.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, instead of using valve elements having effective orifice areas that are weighted in accordance with a geometric progression of two, all the effective orifice areas could be equally weighted if desired. The particular construction of the bistable valve elements disclosed in FIG. 3 has been found to be reliable and trouble free; however, other valve designs may be employed to practice the invention. Although bistable valve elements are preferred, analog valve elements could be employed instead. Concrete is usually the most suitable material for block 16 in view of its low cost and ready availability; however, other materials might also be employed if circumstances dictate. Valve elements 15 are preferably located at the upstream end of valve body 12 as shown in FIG. 1, so the downstream surges resulting from rapid change in flow rate occur within valve body 12, where they are suppressed; if downstream surges are not a problem in a particular application, however, the valve elements could be located downstream of valve body 12. Alternatively, if it is desired to anchor the pipes and conduits both upstream and downstream of the valve elements, two valve bodies or two portions of a single valve body could be provided, one on either side of the valve elements.

What is claimed is:

1. A control valve for handling fluid at high mass flow rates comprising:
   a block of a first material having first and second external faces;
   a plurality of pipes imbedded in the block and extending through the block, the pipes each having a first open end exposed at the first face, and a second open end exposed at the second face, the pipes being made of a second material different from the first material;
   an upstream conduit coupled to the first end of the pipes;
   a downstream conduit coupled to the second end of the pipes; and
   a plurality of valve elements located external to the block adjacent to one of the faces, the valve elements being coupled to one end of the respective pipes to control the flow of fluid through the respective pipes between the upstream and downstream conduits.

2. The control valve of claim 1, in which the upstream and downstream conduits have a substantially smaller cross section than the first and second faces of the block, the upstream conduit is coupled to the first end of the pipes by a diverging adapter conduit connected between the upstream conduit and the first face of the block, the downstream conduit is coupled to the second end of the pipes by a diverging adapter conduit connected between the downstream conduit and the second face of the block, and the valve elements are located inside one of the adapter conduits.

3. The control valve of claim 2, in which the valve elements are located adjacent to the first face of the block so downstream transient disturbances caused by the operation of the valve elements occur within the block.

4. The control valve of claim 3, in which the first end of each pipe is spaced from the first face external of the block and has a mounting flange, and each valve element has a mounting flange secured to the mounting flange of the respective pipes.

5. The control valve of claim 4, in which the first end of one or more of the pipes is spaced from the first face a distance different from the spacing between the first end and the first face of the remaining pipes.

6. The control valve of claim 5, in which the one or more pipes have a smaller cross section than the remaining pipes, and the first end of the one or more pipes is spaced a greater distance from the first face than the spacing between the first end and the first face of the remaining pipes.

7. The control valve of claim 6, additionally comprising a mounting flange at the end of each adapter conduit adjacent to the block, mounting plates anchored to the first and second faces of the block, and means for securing the mounting flanges of the adapter conduits to the mounting plates.

8. The control valve of claim 7, in which the valve elements are bistable, exclusively assuming one of two states, namely, open or closed, the control valve additionally comprising means external to the adapter conduits for controlling the states of the valve elements.

9. The control valve of claim 8, in which the first material is concrete and the second material is a metal chemically nonreactive with the fluid handled by the valve.

10. The control valve of claim 1, in which the valve elements are located adjacent to the first face of the block so downstream transient disturbances caused by the operation of the valve elements occur within the block.

11. The control valve of claim 1, in which one end of each pipe is spaced from the first face external of the block and has a mounting flange, and each valve element has a mounting flange secured to the mounting flange of the corresponding pipe.

12. The control valve of claim 1, in which at least two of the valve elements are spaced different distances from the first face.

13. The control valve of claim 12, in which the valve element spaced further from the first face is coupled to the pipe having the smaller cross section.

14. The control valve of claim 1, additionally comprising mounting plates anchored to the first and second faces of the block and means for securing the upstream and downstream conduits to the respective mounting plates.

15. The control valve of claim 1, in which the valve elements are bistable, exclusively assuming one of two states, namely, open or closed, the control valve additionally comprising means external to the adapter conduit for controlling the states of the valve elements.

16. The control valve of claim 1, in which the first material is concrete and the second material is a metal chemically nonreactive with the fluid handled by the valve.

17. A huge control valve for handling fluid at high mass flow rates comprising:

a mixture of a binder and a filler cast into a solid mass having first and second opposite ends;

a plurality of straight pipes imbedded in the mass and extending in parallel completely through the mass from one end to the other;

a fluid source and a fluid receiver at a pressure lower than the source;

a first adapter conduit coupling the fluid source to the first end of the mass to communicate with the pipes;

a second adapter conduit coupling the second end of the mass to the fluid receiver to communicate with the pipes; and valve means located external to the mass in one of the adapter conduits to control the flow of fluid from the source through the pipes to the receiver.

18. The control valve of claim 17, in which the valve means comprises a plurality of bistable valve elements attached to the respective pipes at the first end of the mass, each valve element being individually controllable to assume either an open state or a closed state.

19. The control valve of claim 17, in which the valve means comprises a plurality of individually actuatable valve elements attached to the respective pipes at one end of the mass, and means external to the adapter conduits for individually actuating the valve elements.

20. The control valve of claim 17, in which the valve means comprises a first plurality of individually actuatable bistable valve elements located external to the mass in one adapter conduit and attached to the respective pipes at the first end of the mass, a second plurality of individually actuatable bistable valve elements located external to the mass in the other adapter conduit and attached to the respective pipes at the other end of the mass, and means for actuating the valve elements attached to each pipe at both ends of the mass together in redundant fashion.

21. The control valve of claim 17, in which the mixture is concrete.

22. The control valve of claim 17, in which the valve means comprises a plurality of individually actuatable valve elements corresponding to the respective pipes, each valve element comprising a perforated stationary cage covering the corresponding pipe at one end of the mass, a support platform attached to the cage in spaced relationship therefrom, an actuator mounted on the support platform, a plug adapted to cover and uncover the cage, and a connector rod coupling the actuator to the plug to uncover and cover the cage responsive to the actuator.

23. The control valve of claim 17, in which the valve means is located in the first adapter conduit.

24. The control valve of claim 17, in which the pipes have mounting flanges at one end of the mass, the valve means comprises a plurality of valve elements equal in number to the pipes, and each valve element has a mounting flange attached to the mounting flange of the corresponding pipe.

25. The control valve of claim 17, in which the pipes extend from one end of the mass different distances and the valve means comprises a plurality of individually actuatable valve elements equal in number to the pipes and connected to the respective pipes at such different distances from the one end of the mass.

26. The control valve of claim 17, additionally comprising mounting plates anchored at the ends of the mass, and mounting flanges on the adapter conduits secured to the respective mounting plates.

* * * * *